United States Patent
Zhao et al.

(10) Patent No.: US 10,185,813 B2
(45) Date of Patent: *Jan. 22, 2019

(54) ORIENTATION AWARE AUTHENTICATION ON MOBILE PLATFORMS

(71) Applicant: Intel Corporation, Santa Clara, CA (US)

(72) Inventors: Jian Zhao, Shanghai (CN); Yi Jin, Shanghai (CN)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/098,964

(22) Filed: Apr. 14, 2016

(65) Prior Publication Data

US 2016/0232337 A1    Aug. 11, 2016

Related U.S. Application Data

(63) Continuation of application No. 13/997,047, filed as application No. PCT/CN2011/083893 on Dec. 13, 2011, now Pat. No. 9,372,980.

(51) Int. Cl.
*G06F 21/36* (2013.01)
*G06F 7/04* (2006.01)
(Continued)

(52) U.S. Cl.
CPC .............. *G06F 21/31* (2013.01); *G06F 21/00* (2013.01); *G06F 21/36* (2013.01); *G09G 5/00* (2013.01); *H04M 1/00* (2013.01); *H04M 1/66* (2013.01)

(58) Field of Classification Search
USPC ........ 455/410, 411, 414.1; 726/19; 713/172, 713/186
See application file for complete search history.

(56) References Cited

U.S. PATENT DOCUMENTS

| 2005/0212911 | A1* | 9/2005 | Marvit ................... G06F 3/017 348/154 |
| 2005/0226468 | A1* | 10/2005 | Deshpande ............. H04M 1/66 382/115 |

(Continued)

FOREIGN PATENT DOCUMENTS

| CN | 1924874 A | 3/2007 |
| CN | 201733357 U | 2/2011 |

(Continued)

OTHER PUBLICATIONS

International Search Report and Written Opinion for PCT Application No. PCT/CN2011/083893, dated Sep. 13, 2012, 10 pages.

(Continued)

*Primary Examiner* — Jeffrey C Pwu
*Assistant Examiner* — Samuel Ambaye
(74) *Attorney, Agent, or Firm* — Jordan IP Law, LLC

(57) ABSTRACT

Systems and methods may provide for receiving an authentication input and determining an authentication orientation of a mobile platform during entry of the authentication input. In addition, a determination may be made as to whether to validate a user based on the authentication input and the authentication orientation of the mobile platform. Platform orientation may also be used to detect malware.

13 Claims, 3 Drawing Sheets

(51) Int. Cl.
*G06F 12/00* (2006.01)
*G06F 12/14* (2006.01)
*G06F 13/00* (2006.01)
*G06F 17/30* (2006.01)
*G06F 7/00* (2006.01)
*G06F 21/31* (2013.01)
*G06F 21/00* (2013.01)
*H04M 1/66* (2006.01)
*G09G 5/00* (2006.01)
*H04M 1/00* (2006.01)

(56) References Cited

U.S. PATENT DOCUMENTS

| | | |
|---|---|---|
| 2008/0305771 A1 | 12/2008 | Yajima et al. |
| 2009/0203355 A1 | 8/2009 | Clark |
| 2010/0069115 A1* | 3/2010 | Liu .................. H04M 1/72569 455/556.1 |
| 2011/0145587 A1* | 6/2011 | Park ........................ G06F 21/36 713/182 |
| 2011/0223888 A1 | 9/2011 | Esaki |
| 2011/0258049 A1 | 10/2011 | Ramer et al. |

FOREIGN PATENT DOCUMENTS

| | | |
|---|---|---|
| JP | 2003091509 A | 3/2003 |
| JP | 2006079427 A | 3/2006 |
| JP | 2011035855 A | 2/2011 |
| TW | 201140120 A1 | 11/2011 |
| WO | 2013/086688 A1 | 6/2013 |

OTHER PUBLICATIONS

Office Action for Japanese Patent Application No. 2014-546266, dated Jul. 21, 2015, 4 pages including 2 pages of English translation.
Office Action for Korean Patent Application No. 2014-7015936, dated Jun. 24, 2015, 7 pages including 2 pages of English translation.
European Search Report for EP Patent Application No. 11877507.1, dated Jul. 14, 2015, 6 pages.
Office Action and Search Report for Chinese Patent Application No. 201180075480.2, dated Nov. 26, 2015, 20 pages including 13 pages of English translation.
Office Action for Korean Patent Application No. 2014-7015936, dated Jan. 29, 2016, 5 pages including 2 pages of English translation.
Office Action for U.S. Appl. No. 13/997,047, dated Jun. 5, 2015, 14 pages, United States Patent and Trademark Office.
Notice of Allowance for U.S. Appl. No. 13/997,047, dated Nov. 24, 2015, 9 pages, United States Patent and Trademark Office.
Notice of Allowance for U.S. Appl. No. 13/997,047, dated Dec. 16, 2015, 5 pages, United States Patent and Trademark Office.
Notice of Allowance for U.S. Appl. No. 13/997,047, dated Feb. 26, 2016, 10 pages, United States Patent and Trademark Office.
Notice of Allowance for Korean Patent Application No. 10-2014-7015936, dated Mar. 31, 2016, 4 pages including 1 page of English translation.
Office Action for Chinese Patent Application No. 201180075480.2, dated Aug. 2, 2016, 7 pages including 4 pages of English translation.
Office Action for Korean Patent Application No. 10-2016-7017433, dated Aug. 23, 2016, 10 pages including 5 pages of English translation.
Office Action for Japanese Patent Application No. 2016-087410, dated May 9, 2017, 6 pages including 4 pages of English translation.
Office Action for Japanese Patent Application No. 2016-087410, dated Aug. 15, 2017, 5 pages including 3 pages of English translation.
Notice of Allowance for Korean Patent Application No. 2016-7017433, dated Sep. 20, 2017, 3 pages including 1 page of English translation.
Office Action for European Patent Application No. 11877507.1, dated Jan. 22, 2018, 6 pages.
Office Action for Korean Patent Application No. 2016-7017433, dated Feb. 20, 2017, 14 pages including 7 pages of English translation.
Office Action for European Patent Application No. 11877507.1, dated Sep. 27, 2018, 5 pages.

* cited by examiner

ORIENTATION AWARE AUTHENTICATION ON MOBILE PLATFORMS

CROSS-REFERENCE TO RELATED APPLICATIONS

This application is a continuation of U.S. patent application Ser. No. 13/997,047, filed Oct. 18, 2013, which claims the benefit of priority to International Patent Application No. PCT/CN2011/083893, filed Dec. 13, 2011.

BACKGROUND

Technical Field

Embodiments generally relate to user authentication on mobile platforms. More particularly, embodiments relate to the use of device orientation information to authenticate users and detect malware.

Discussion

Conventional smart phones may include software to authenticate users in order to prevent access by unauthorized individuals. Such authentication software may require the user to enter a password or draw a particular path on a touch screen of the smart phone. While these solutions may be suitable under certain circumstances, there remains considerable room for improvement. For example, nearby individuals could observe the entry of passwords or path traces. Indeed, some path tracing solutions may leave a finger trail on the touch screen that could be ascertained by individuals not present during authentication. Moreover, conventional user authentication solutions may fail to provide any protection against malware running on the smart phone that downloads data or conducts other unauthorized operations.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include an apparatus having logic to receive an authentication input via a user interface of a mobile platform, and determine an authentication orientation of the mobile platform. The logic may also determine whether to validate a user based on the authentication input and the authentication orientation of the mobile platform.

Embodiments may also include a non-transitory computer readable storage medium having a set of instructions which, if executed by a processor, cause a mobile platform to receive an authentication input. The instructions can also cause the mobile platform to determine an authentication orientation of the mobile platform, and determine whether to validate a user based on the authentication input and the authentication orientation of the mobile platform.

Other embodiments may include a mobile platform having a sensor, and logic to receive an authentication input via a user interface of the mobile platform. The logic can also determine an authentication orientation of the mobile platform based on one or more signals from the sensor, and determine whether to validate a user based on the authentication input and the authentication orientation of the mobile platform.

Figure 1A:
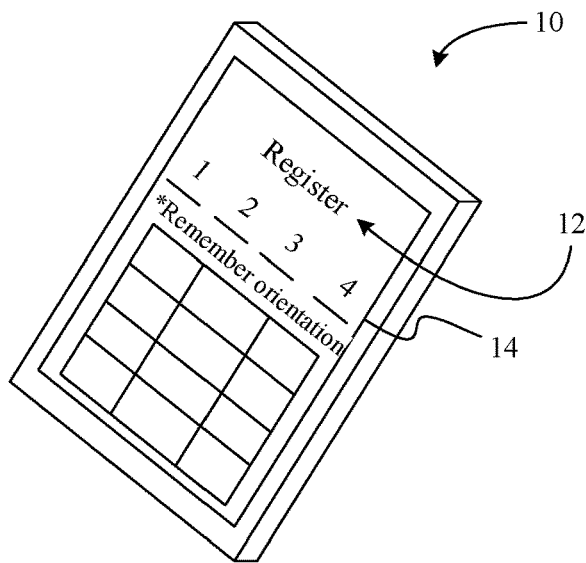
FIGS. 1A-1C are perspective views of examples of mobile platforms according to embodiments.

Turning now to FIG. 1A, a mobile platform 10 is shown in which a touch screen display 14 of the mobile platform 10 includes a registration prompt 12 for a user of the mobile platform 10 to enter an authentication input. In the illustrated example, the authentication input includes a PIN (personal identification number, e.g., "1-2-3-4"). Other forms of authentication input such as, for example, passwords, finger trace paths, puzzle configurations, click sequences (e.g., selecting objects such as a nose, mouth, ear, etc., in a particular order), spoken input, biological input (e.g., fingerprint, eye scan), and so forth, may also be used. As will be discussed in greater detail, the mobile platform 10 can also determine the orientation of the mobile platform 10 while the authentication input is being entered (e.g., the "authentication orientation"), wherein the authentication orientation may be used to authenticate subsequent users of the mobile platform. Simply put, authentication may require the user to hold the mobile platform 10 in the same (or similar) orientation before the user will be permitted to access the mobile platform 10. Therefore, the illustrated registration prompt 12 also notifies/reminds the user that the platform orientation will be required for subsequent authentication attempts (e.g., "*Remember Orientation").

Figure 1B:
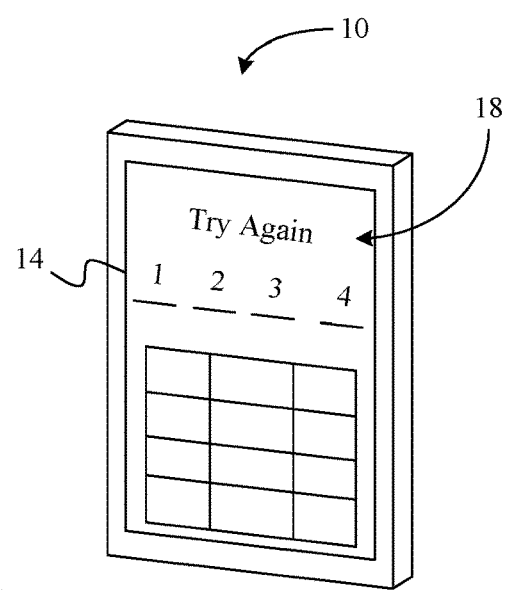

FIG. 1B shows the mobile platform 10 when the correct authentication input is entered but the mobile platform 10 is in an incorrect orientation. In particular, the display 14 includes a rejection output 18 (e.g., "Try again") because the mobile platform 10 is not positioned in the same orientation as the orientation that was recorded during the registration process. Accordingly, the user may be required to re-enter the authentication input. Of particular note is that the user is not instructed to re-position the mobile platform 10, in the example shown. As a result, unauthorized users may assume that the authentication input is incorrect, and continue to guess PINs until they are locked out. Bona fide users, on the other hand, may have knowledge of the orientation aware authentication functionality and might suspect that the mobile platform 10 merely needs to be positioned differently.

Alternatively, the user might be presented with a message such as "Try a different orientation" if the authentication input is received while the mobile platform 10 is in the incorrect orientation. Moreover, a direction deviation tolerance (e.g., one degree) may be used so that if the orientation deviation is very small, an additional prompt can be generated without adding the login attempt to a fail list. In one example, the fail list could be set to, for example, five or ten consecutive failed login attempts, with a certain waiting period (e.g., 60 sec) being used for subsequent attempts.

Figure 1C:
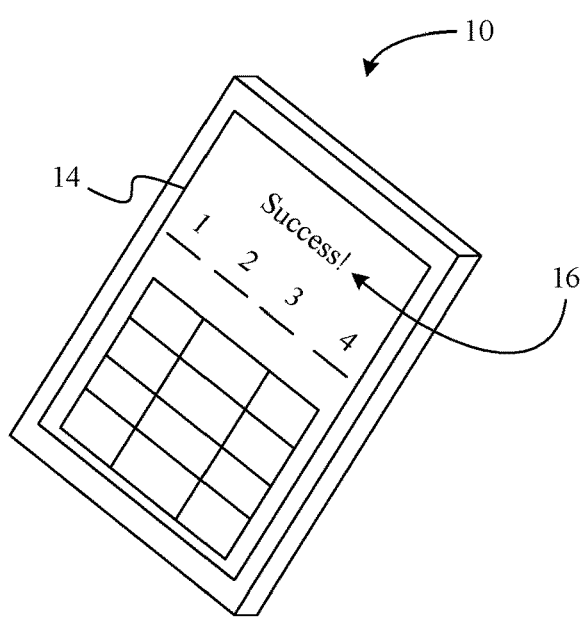

The rejection output 18 could also be formatted with a certain highlighting and/or color to give a subtle hint to the user that the validation denial was due to the device orientation. The same formatting may be applied to the registration prompt 12 (FIG. 1A, e.g., format "*Remember Orientation" the same way as "Try Again"). Such a solution may strengthen the orientation reminder with respect to bona fide users while masking the orientation functionality from unauthorized users. FIG. 1C demonstrates that if the correct orientation (i.e., the orientation of FIG. 1A) is used during entry of the authentication input, an approval output 16 (e.g., "Success!") can be generated by the display 14. The approval output 16 could alternatively be the home screen of the mobile platform 10.

Figures 2, 3:
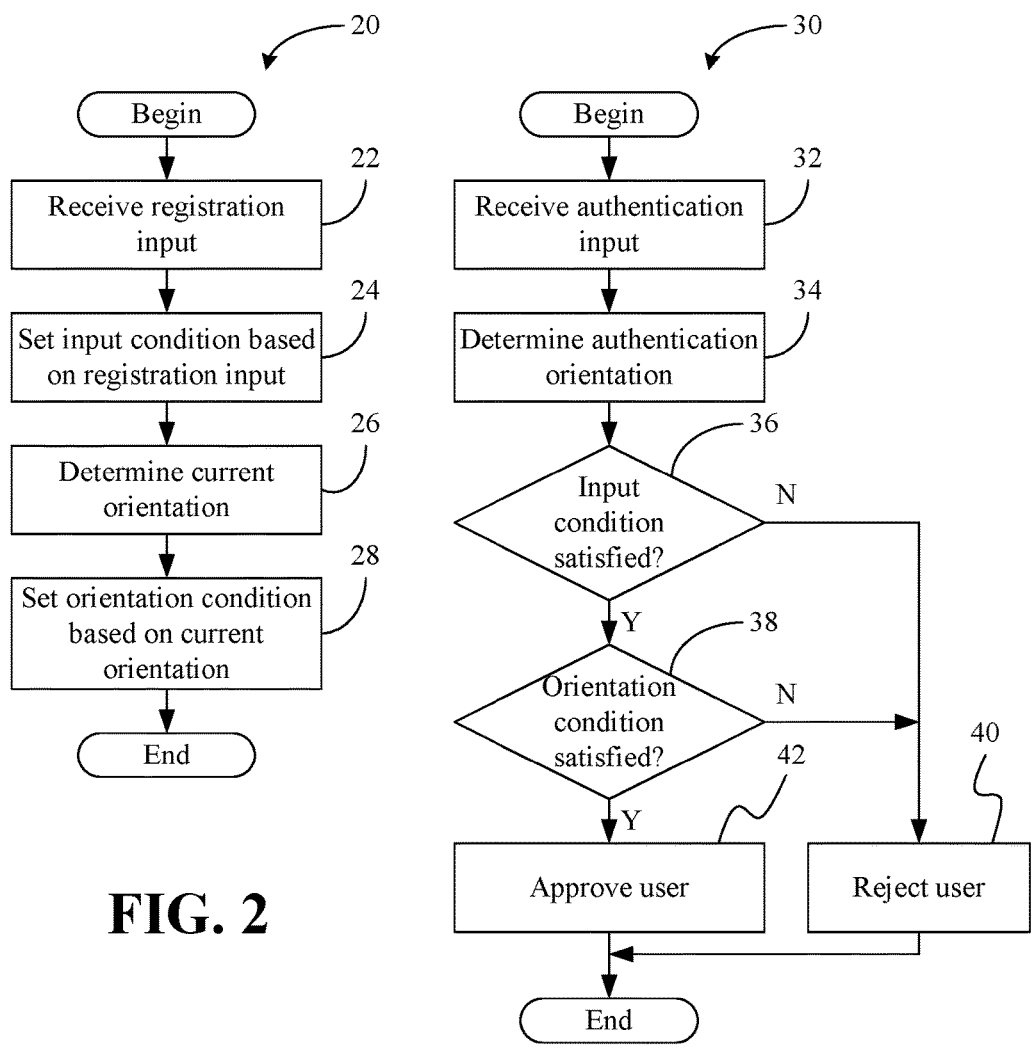
FIG. 2 is a flowchart of an example of a method of registering authentication information with a mobile device according to an embodiment.
FIG. 3 is a flowchart of an example of a method of authenticating a user according to an embodiment.

Turning now to FIG. 2, a method 20 of registering authentication information is shown. The method 20 may be implemented in a mobile platform such as the mobile platform 10 (FIGS. 1A-1C) as one or more sets of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof.

Illustrated processing block 22 provides for receiving registration input, wherein the registration input could include a PIN, password, finger trace path, puzzle configuration, spoken input, biological input, and so forth. An input condition may be set at block 24 based on the registration input. Thus, if the digits 1-2-3-4 are entered as registration input, the input condition might be set to 1-2-3-4. Block 25 may determine the current orientation of the mobile platform during entry of the registration input. The orientation can be determined by accessing a signal from a sensor such as an accelerometer, gyroscope, gravity sensor, etc., resident on the mobile platform. In particular, the orientation could be a 3D (three-dimensional) value that indicates the platform's positioning with respect to three axes (or planes). An orientation condition may be set at block 28 based on the current orientation, wherein the input condition and the orientation condition may be associated with one another and subsequently used to authenticate users of the mobile platform.

FIG. 3 shows a method 30 of authenticating a user of a mobile platform. The method 30 may be implemented in, for example, a mobile platform such as the mobile platform 10 (FIGS. 1A-1C) as one or more sets of logic instructions stored in a machine- or computer-readable storage medium such as RAM, ROM, PROM, firmware, flash memory, etc., in configurable logic such as PLAs, FPGAs, CPLDs, in fixed-functionality logic hardware using circuit technology such as ASIC, CMOS or TTL technology, or any combination thereof.

Illustrated processing block 32 provides for receiving an authentication input via a mobile platform user interface such as the aforementioned touch screen display 14 (FIGS. 1A-1C). The authentication input could include a PIN, password, finger trace path, puzzle configuration, spoken input, biological input, etc., as already discussed. An authentication orientation of the mobile platform may be determined at block 34, wherein the authentication orientation may represent the orientation of the mobile platform during entry of the authentication input. Thus, the authentication orientation could be obtained by accessing a signal from a sensor such as an accelerometer, gyroscope, gravity sensor, etc., resident on the mobile platform.

Block 36 may compare the authentication input to the input condition set during the registration process, wherein if the input condition is satisfied (e.g., the correct PIN has been entered), a determination may be made at block 38 as to whether the orientation condition associated with the input condition has been satisfied. Thus, block 38 could involve comparing the authentication orientation to the orientation of the mobile platform during the registration process. The comparison may use a variability threshold (e.g., ≤3 degrees deviation) to determine whether the orientation condition is satisfied. If either the authentication input does not satisfy the input condition, or the authentication orientation does not satisfy the orientation condition associated with the input condition, the user may be rejected (e.g., denied validation/access) at block 40. Thus block 40 might involve issuing a rejection output such as the rejection output 18 (FIG. 1B), already discussed. If, on the other hand, the authentication input satisfies the input condition and the authentication orientation satisfies the orientation condition associated with the input condition, illustrated block 42 approves (e.g., grants validation/access to) the user. Thus, block 42 may involve issuing an approval output such as the approval output 16 (FIG. 1C), already discussed.

The pseudo code below shows one approach to conducting a login process with respect to a mobile platform.

```
If get a correct password
    If in a correct orientation
        Successfully login
    Else
        Return to the login window
    Endif
Else
    Return to the login window
Endif
```

Figure 4:
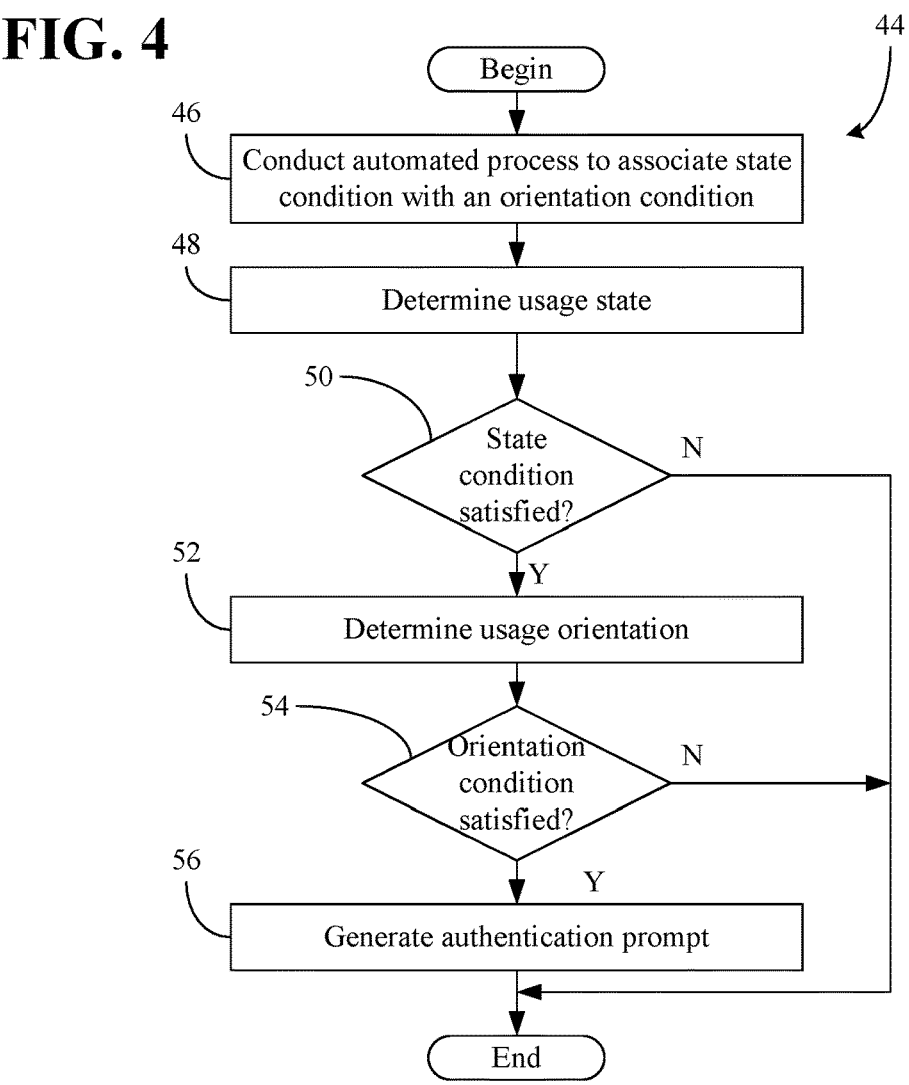
FIG. 4 is a flowchart of an example of a method of triggering an authentication process according to an embodiment.

Turning now to FIG. 4, a method 44 is shown in which orientation aware authentication is triggered by a particular usage state of a mobile platform. The method 44 may be implemented in, for example, a mobile platform such as the mobile platform 10 (FIGS. 1A-1C) as one or more sets of logic instructions stored in a machine- or computer-readable storage medium such as RAM, ROM, PROM, firmware, flash memory, etc., in configurable logic such as PLAs, FPGAs, CPLDs, in fixed-functionality logic hardware using circuit technology such as ASIC, CMOS or TTL technology, or any combination thereof.

Generally, it may be possible for either an individual or malware to gain access to a mobile platform without encountering authentication. For example, if the mobile platform is configured with a timeout setting that permits a certain period of inactivity (e.g., five minutes) before requiring authentication, an unauthorized individual could intervene on the mobile platform during the timeout period without knowledge of the authorized user and effectively bypass authentication. In addition, malware might be downloaded to the mobile platform via a network or other connection, wherein the malware may transfer large amounts of data to or from the mobile platform without knowledge of the authorized user (e.g., in "stealth" mode"). The illustrated method 44 may therefore enable certain mobile platform "state conditions" such as the execution of specific applications (e.g., web browser, text messaging software), certain data transfer rates, and so forth, to be defined and used to trigger orientation aware authentication.

In particular, processing block 46 may conduct an automated process to associate a state condition of a mobile platform with an orientation condition of the mobile platform. The state condition may include, for example, the execution of a particular application such as a web browser. In such a case, it may be determined that the authorized user typically holds the mobile platform in a certain orientation (e.g., landscape position and tilted back at thirty degrees) while using the web browser. Thus, the state condition of [web_browser_execution] could be associated with the orientation condition of [landscape_position, 0-30-0]. In another example, the state condition may include a relatively high data transfer rate. In such a case, it may be determined that the authorized user typically imparts at least some motion to the mobile platform (e.g., is not stationary) while downloading large files. Thus, the state condition of [download_rate>500 Mbit/s] might be associated with the orientation condition [motion>0]. Other state conditions and orientation conditions may be designated depending on the circumstances. Moreover the association process in block 46 can be conducted automatically (e.g., in the background) as the authorized user handles the mobile platform in the user's daily routine.

The current usage state of the mobile platform device may be determined at block 48, wherein illustrated block 50 determines whether the usage state satisfies a predefined state condition. Therefore, in the example of the execution of a particular application being used as a state condition, block 50 might determine whether the mobile platform is currently executing the application in question (e.g., if [web_browser_execution] is true). Similarly, in the example of a data transfer rate being used as a state condition, block 50 can determine whether the mobile platform is transferring data at or above the specified rate (e.g., if [download_rate>500 Mbit/s] is true). If the state condition is satisfied, a "usage orientation" of the mobile platform (e.g., the current orientation of the mobile platform) may be determined at block 52, wherein illustrated block 54 determines whether the usage orientation satisfies the orientation condition that has been previously associated with state condition.

Thus, in the example of a particular application being used as a state condition, block 54 may determine whether the mobile platform is in the orientation that the authorized user typically uses for the application in question (e.g., if [landscape_position, 0-30-0] is true). Similarly, in the example of a data transfer rate being used as a state condition, block 54 could determine whether the mobile platform is moving (e.g., if [motion>0] is true). If both the state condition and its associated orientation condition are satisfied, illustrated block 56 generates an authentication prompt, which may trigger an orientation aware authentication process as discussed above.

The pseudo code below shows one approach to triggering a login process.

If there is still some network related application still running with a high data flow

---

If there is still some network related application still running with a high data flow
    Alert the user and request acknowledgement or dispose
Else
    Do nothing special
Endif

---

Figure 5:
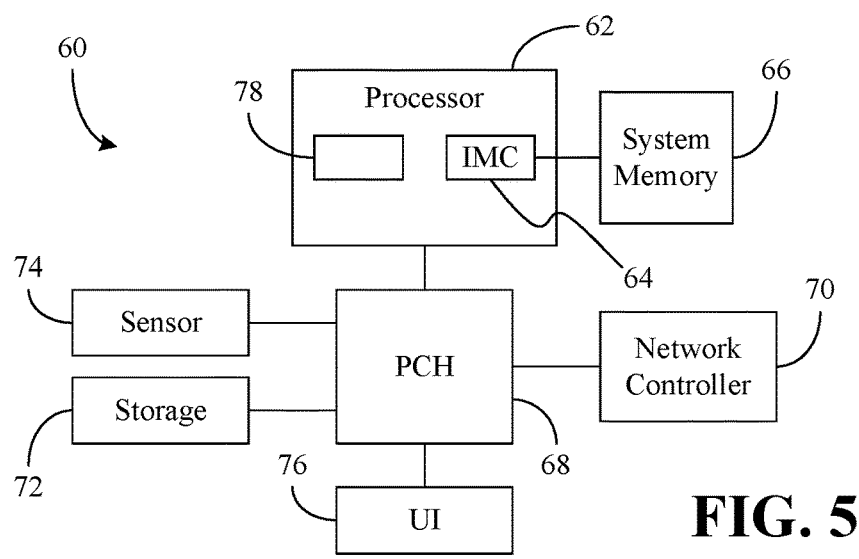
FIG. 5 is a block diagram of an example of a mobile platform according to an embodiment.

Turning now to FIG. 5, a mobile platform 60 is shown. The platform 60 may have computing functionality (e.g., personal digital assistant/PDA, laptop, smart tablet), communications functionality (e.g., wireless smart phone), imaging functionality (e.g., camera, camcorder), media playing functionality (e.g., smart television/TV), or any combination thereof (e.g., mobile Internet device/MID). In the illustrated example, the platform 60 includes a processor 62 that has an integrated memory controller (IMC) 64, which may communicate with system memory 66. The system memory 66 may include, for example, dynamic random access memory (DRAM) configured as one or more memory modules such as, for example, dual inline memory modules (DIMMs), small outline DIMMs (SODIMMs), etc.

The illustrated platform 60 also includes a platform controller hub (PCH) 68, sometimes referred to as a Southbridge of a chipset, that functions as a host device and may communicate with a network controller 70, storage (e.g., hard disk drive/HDD, optical disk, flash memory, etc.) 72, a sensor (e.g., accelerometer, gyroscope, gravity sensor) 74, and a user interface (UI, e.g., touch screen, monitor, mouse, keyboard, microphone) 76. The illustrated processor 62 may execute logic 78 that is configured to receive an authentication input via the UI 76, determine an authentication orientation of the platform 60 based on a signal from the sensor 74, and determine whether to validate a user based on the authentication input and the authentication orientation of the platform 60. In one example, the logic 78 is also configured to conduct a registration process to associate an orientation condition with an input condition of the mobile platform, wherein the input condition and associated orientation condition may be used to either reject or approve users of the platform 60. Moreover, the logic 78 may be configured to conduct an automated process to associate an orientation condition with a state condition, wherein the state condition and associated orientation condition can be used to trigger an orientation aware authentication process. The various input conditions, state conditions, and associated orientation conditions may be stored locally in memory such as the storage 72 and/or remotely on another platform.

Techniques described herein may therefore provide a better and more secure user experience with respect to mobile devices and/or platforms such as smart phones and tablets. The techniques may also provide solutions to unaddressed concerns such as intervening individuals and undetected malware, while leveraging sensing technology that might already be present on the platform.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A mobile platform comprising: a sensor; and logic implemented at least partly in one or more of configurable logic or fixed-functionality logic hardware, the logic to, conduct an authentication of a user, wherein to conduct the authentication of the user, the logic is to: receive an authentication input via a user interface of the mobile platform, detect an authentication orientation of the mobile platform based on one or more signals from the sensor, wherein the authentication orientation is a three-dimensional value that indicates the platform's positioning with respect to three axes, and determine whether the user is permitted to access the mobile platform based on the authentication input and the authentication orientation of the mobile platform, associate another orientation with the mobile platform, and determine whether to conduct the authentication of the user based upon whether the another orientation satisfies an orientation condition associated with the mobile platform, wherein when the logic determines that the authentication is to be conducted based on the another orientation satisfying the orientation condition, the logic is to: disallow access to the mobile platform, and trigger the authentication of the user.

2. The mobile platform of claim 1, wherein the logic is to reject the user to deny the user access to the mobile platform if either the authentication input does not satisfy an input condition or the authentication orientation does not satisfy an orientation condition associated with the input condition.

3. The mobile platform of claim 2, wherein the logic is to approve the user to permit the user access to the mobile platform if the authentication input satisfies the input condition and the authentication orientation satisfies the orientation condition associated with the input condition.

4. The mobile platform of claim 2, wherein the logic is to conduct a registration process to associate the orientation condition with the input condition.

5. A non-transitory computer readable storage medium comprising a set of instructions which, if executed by a processor, cause a mobile platform to: conduct an authentication of a user, wherein to conduct the authentication of the user, the instructions cause the mobile platform to: receive an authentication input; detect an authentication orientation of the mobile platform, wherein the authentication orientation is a three-dimensional value that indicates the platform's positioning with respect to three axes; and determine whether the user is permitted to access the mobile platform based on the authentication input and the authentication orientation of the mobile platform; associate another orientation with the mobile platform; and determine whether to conduct the authentication of the user based upon whether the another orientation satisfies an orientation condition associated with the mobile platform; wherein when the authentication is determined to be conducted based on the another orientation satisfying the orientation condition, the instructions cause the mobile platform to: disallow access to the mobile platform, and trigger the authentication of the user.

6. The medium of claim 5, wherein the instructions, if executed, cause the mobile platform to reject the user to deny the user access to the mobile platform if either the authentication input does not satisfy an input condition or the authentication orientation does not satisfy an orientation condition associated with the input condition.

7. The medium of claim 6, wherein the instructions, if executed, cause the mobile platform to approve the user to permit the user access to the mobile platform if the authentication input satisfies the input condition and the authentication orientation satisfies the orientation condition associated with the input condition.

8. The medium of claim 6, wherein the instructions, if executed, cause the mobile platform to conduct a registration process to associate the orientation condition with the input condition.

9. An apparatus comprising: logic implemented at least partly in one or more of configurable logic or fixed-functionality logic hardware, the logic to, conduct an authentication of a user, wherein to conduct the authentication of the user, the logic is to: receive an authentication input via a user interface of a mobile platform, detect an authentication orientation of the mobile platform, wherein the authentication orientation is a three-dimensional value that indicates the platform's positioning with respect to three axes, and determine whether the user is permitted to access the mobile platform based on the authentication input and the authentication orientation of the mobile platform, associate another orientation with the mobile platform, and determine whether to conduct the authentication of the user based upon whether the another orientation satisfies an orientation condition associated with the mobile platform, wherein when the logic determines that the authentication is to be conducted based on the another orientation satisfying the orientation condition, the logic is to:

disallow access to the mobile platform, and trigger the authentication of the user.

10. The apparatus of claim 9, wherein the logic is to reject the user to deny the user access to the mobile platform if either the authentication input does not satisfy an input condition or the authentication orientation does not satisfy an orientation condition associated with the input condition.

11. The apparatus of claim 10, wherein the logic is to approve the user to permit the user access to the mobile platform if the authentication input satisfies the input condition and the authentication orientation satisfies the orientation condition associated with the input condition.

12. The apparatus of claim 10 wherein the logic is to conduct a registration process to associate the orientation condition with the input condition.

13. A mobile platform comprising: a sensor; and logic implemented at least partly in one or more of configurable logic or fixed-functionality logic hardware, the logic to, associate an orientation with the mobile platform, determine whether to conduct an authentication of a user based upon whether the orientation satisfies an orientation condition, and when the authentication of the user is determined to be conducted based upon the orientation satisfying the orientation condition, the logic is to: disallow access to the mobile platform, receive an authentication input via a user interface of the mobile platform, detect an authentication orientation of the mobile platform based on one or more signals from the sensor, wherein the authentication orientation is a three-dimensional value that indicates the platform's positioning with respect to three axes, and determine whether the user is permitted to access the mobile platform based on the authentication input and the authentication orientation of the mobile platform.

* * * * *